Oct. 28, 1958

J. E. LUCAS 2,858,105

CABLE TYPE GRIPPING DEVICE FOR CAISSONS
OR PILINGS AND METHOD

Filed July 19, 1954

INVENTOR
Joseph E. Lucas

BY Bacon + Thomas

ATTORNEYS

Oct. 28, 1958  
J. E. LUCAS  
2,858,105  
CABLE TYPE GRIPPING DEVICE FOR CAISSONS  
OR PILINGS AND METHOD  
Filed July 19, 1954  
11 Sheets-Sheet 3

INVENTOR  
Joseph E. Lucas  
BY  
Bacon + Thomas  
ATTORNEYS

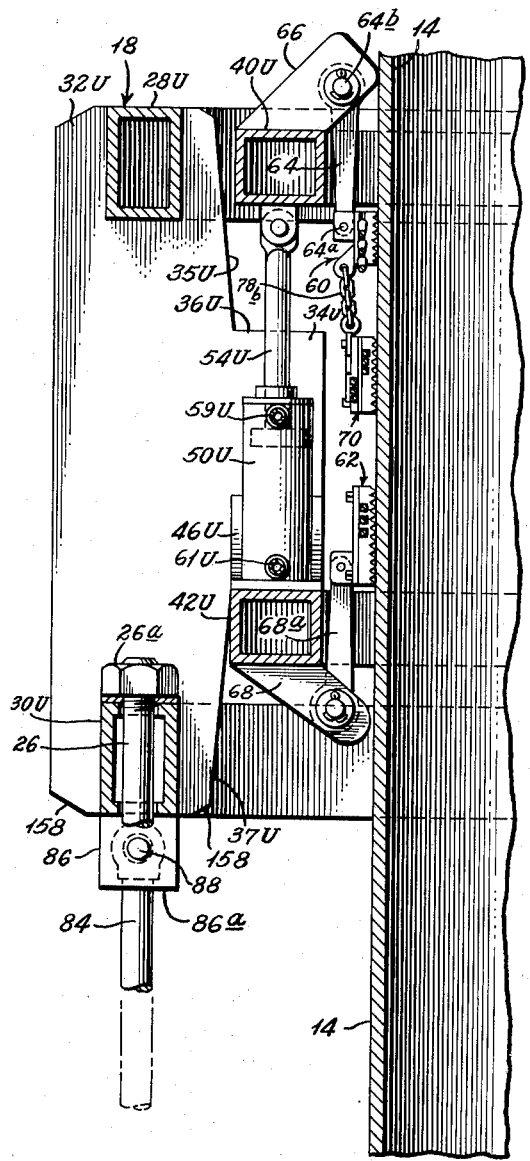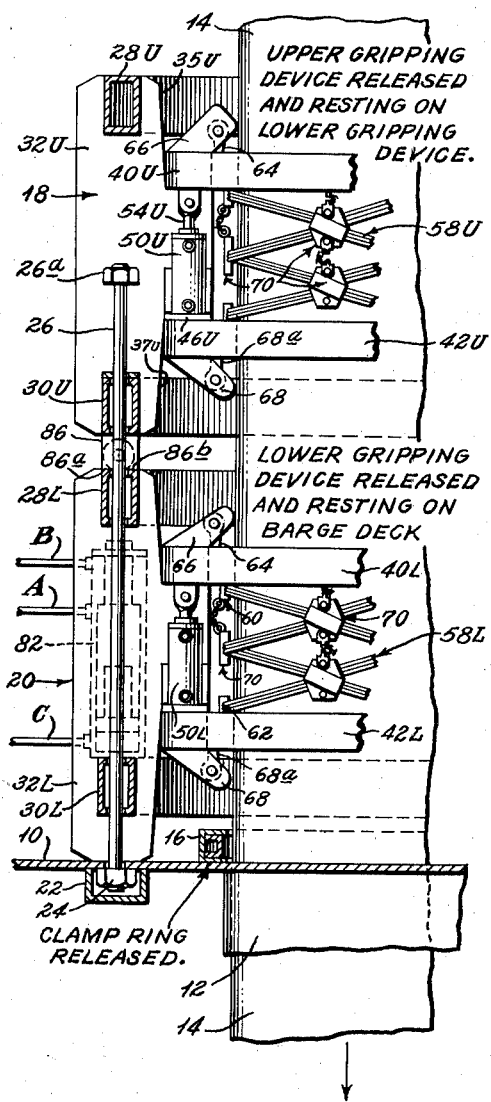

Oct. 28, 1958     J. E. LUCAS     2,858,105
CABLE TYPE GRIPPING DEVICE FOR CAISSONS
OR PILINGS AND METHOD
Filed July 19, 1954     11 Sheets-Sheet 5
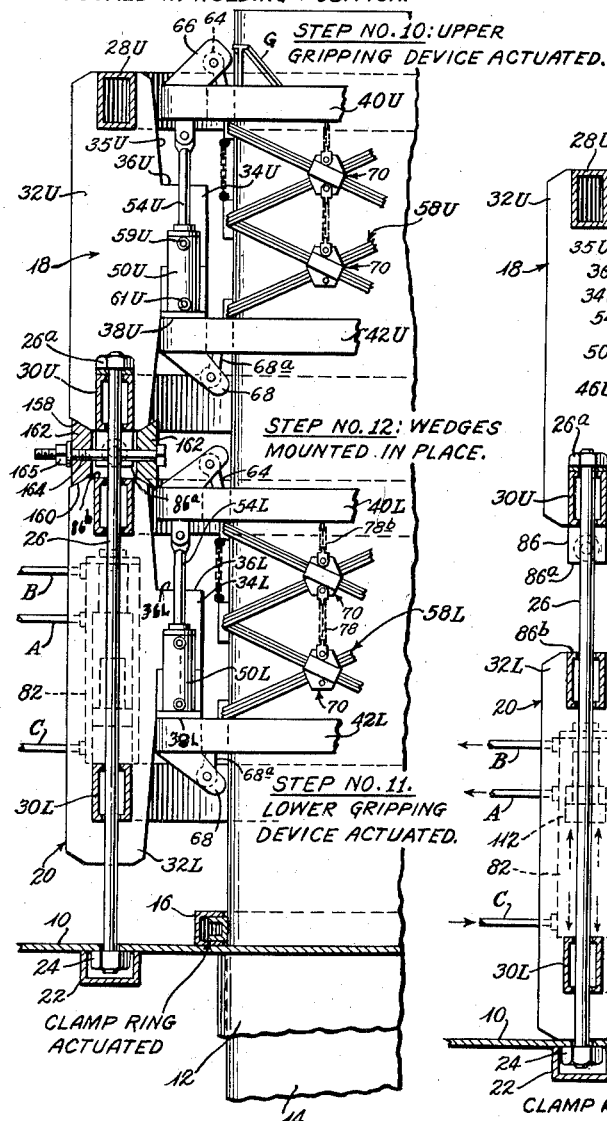
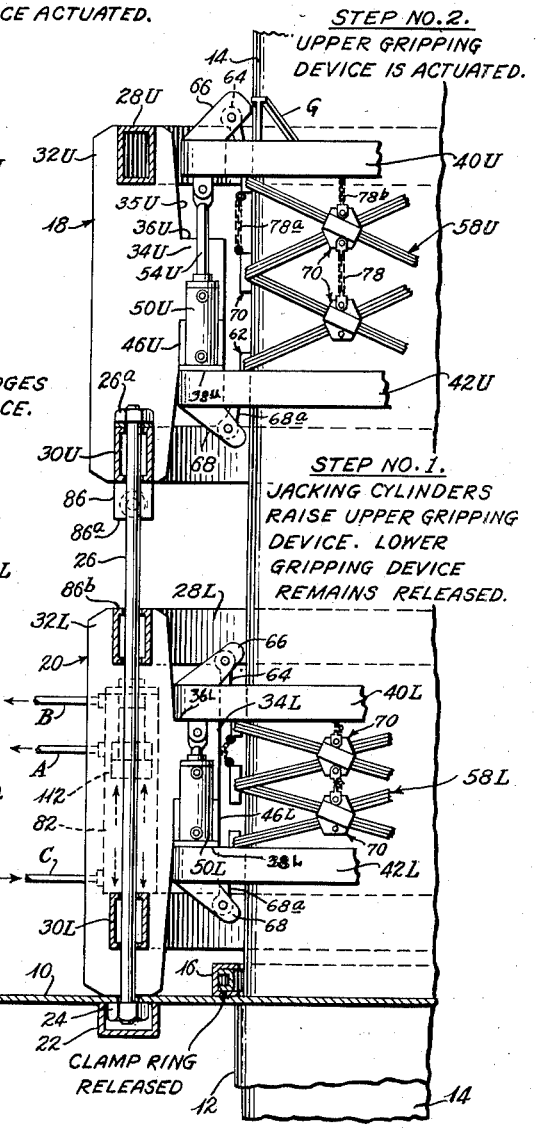
INVENTOR
Joseph E. Lucas
BY Bacon & Thomas
ATTORNEYS

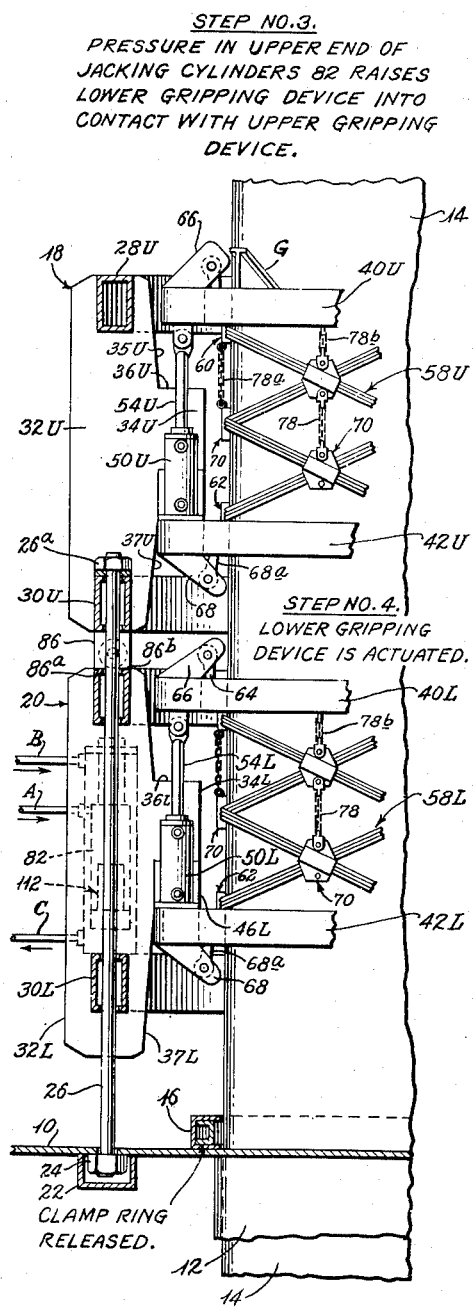
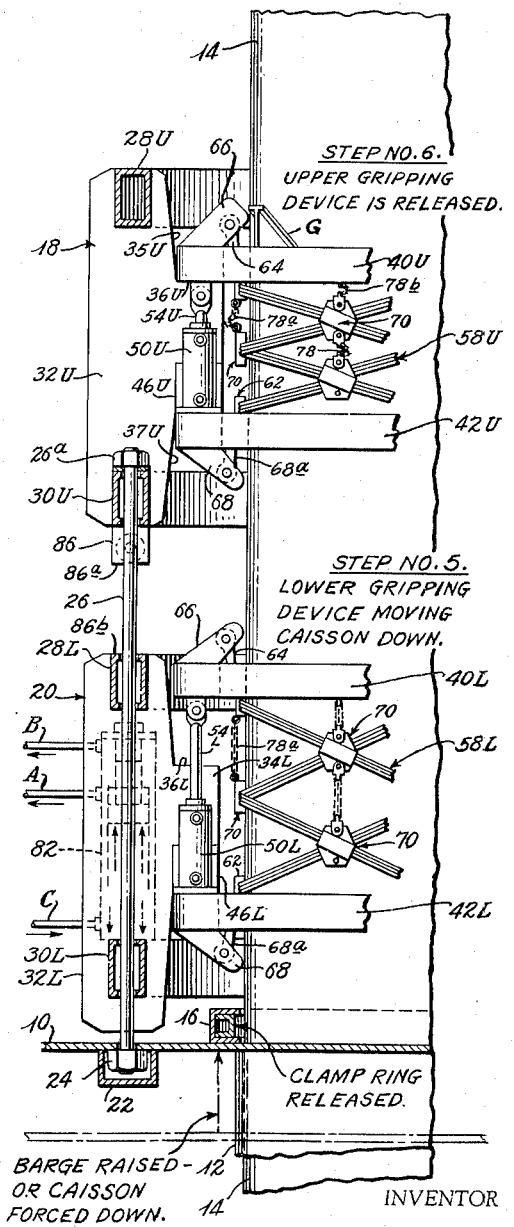

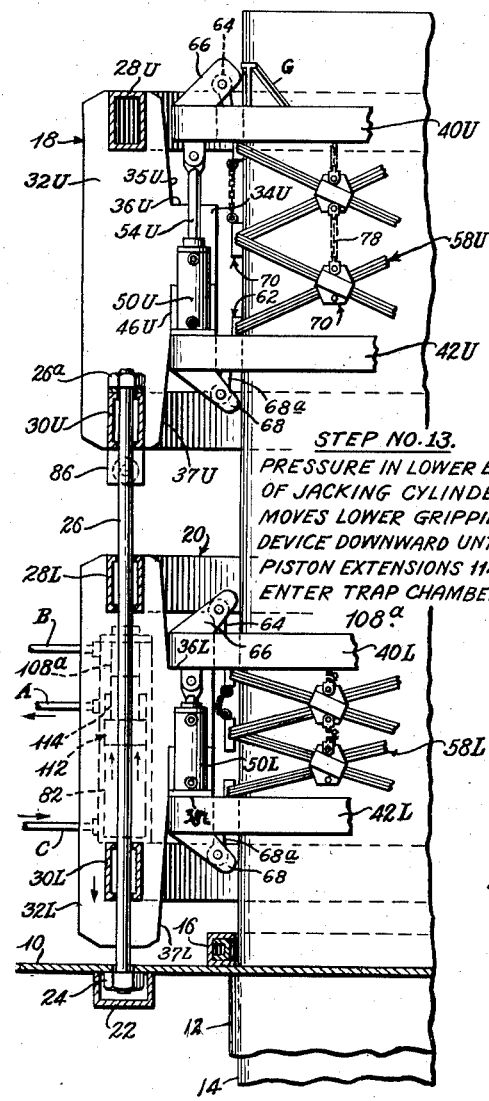
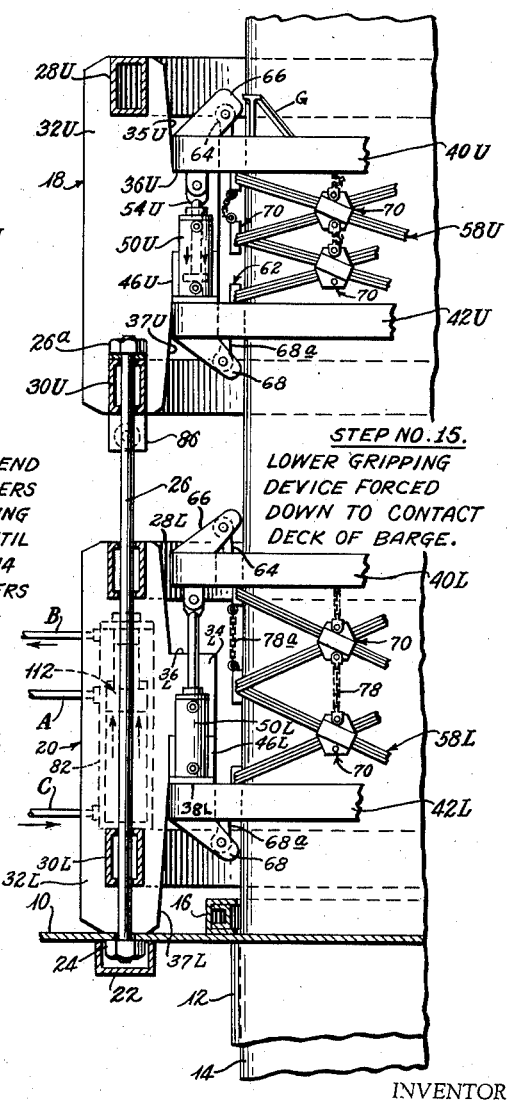

Oct. 28, 1958        J. E. LUCAS        2,858,105
CABLE TYPE GRIPPING DEVICE FOR CAISSONS
OR PILINGS AND METHOD
Filed July 19, 1954        11 Sheets-Sheet 8
*Fig. 14.*
LOWERING BARGE
*Fig. 15.*
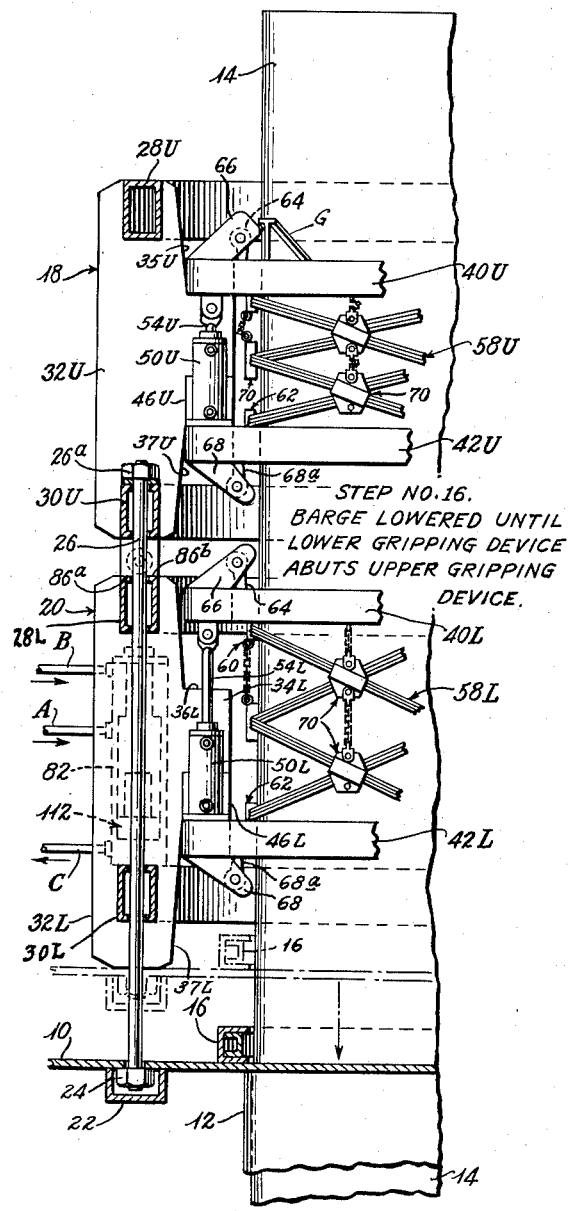
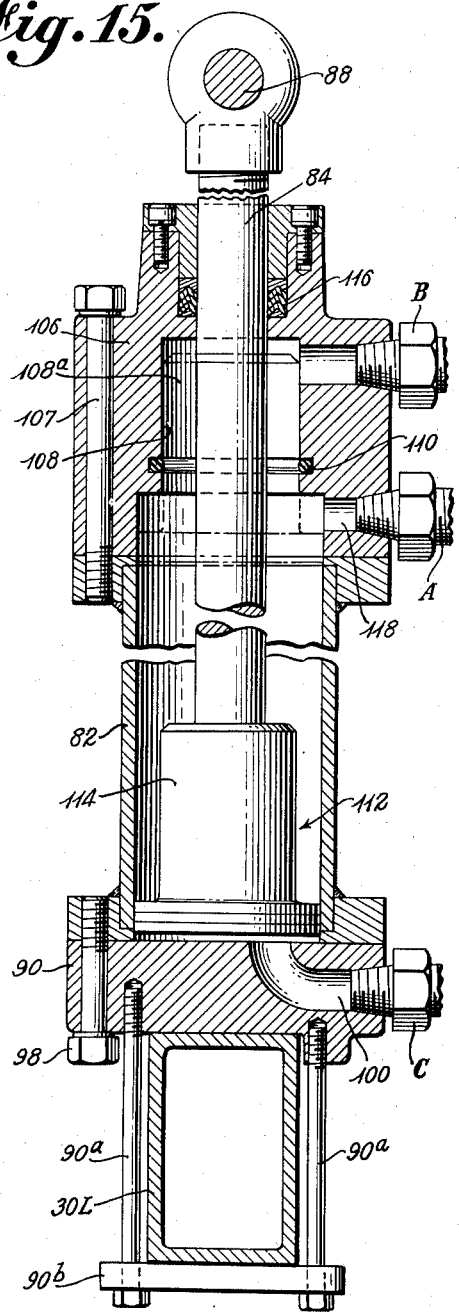
STEP NO. 16.
BARGE LOWERED UNTIL
LOWER GRIPPING DEVICE
ABUTS UPPER GRIPPING
DEVICE.
INVENTOR
Joseph E. Lucas
BY Bacon + Thomas
ATTORNEYS

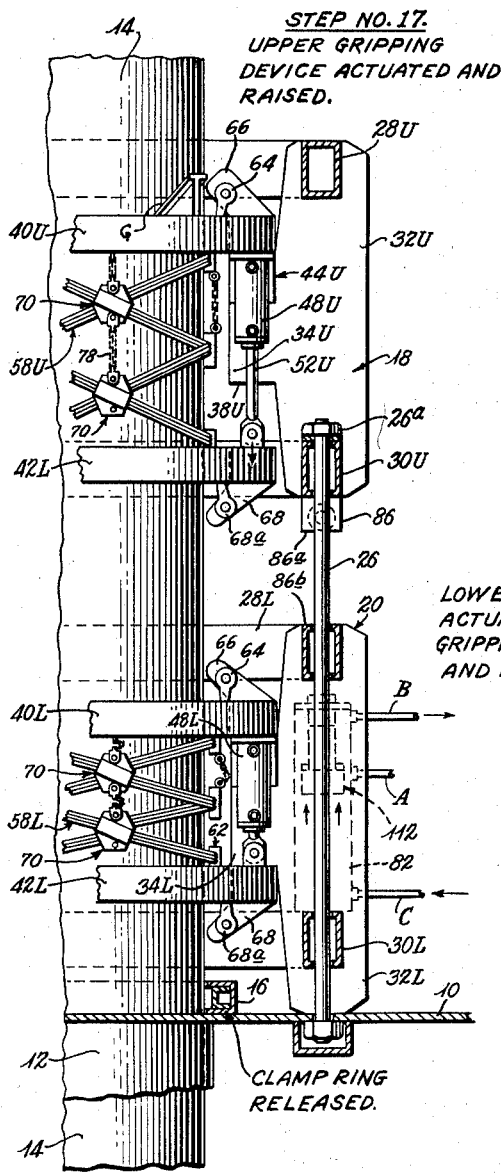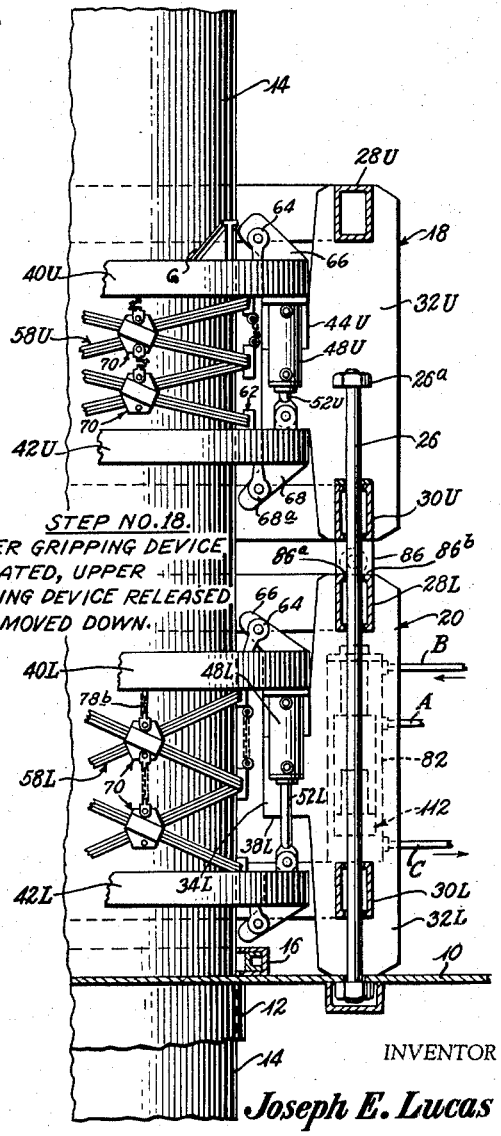

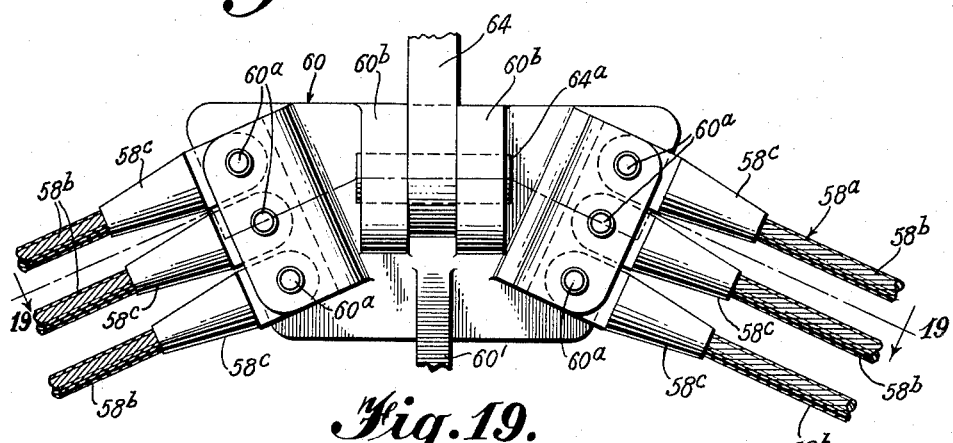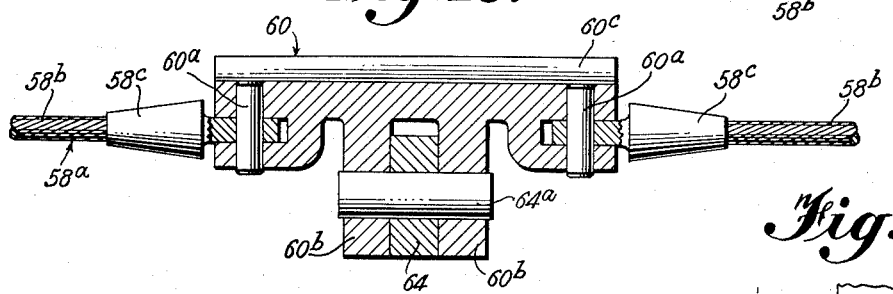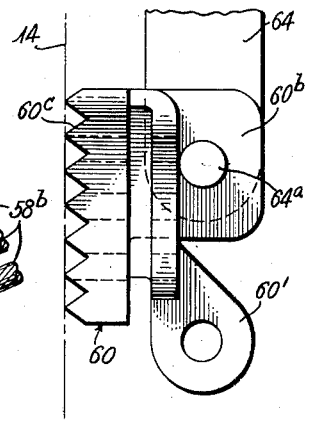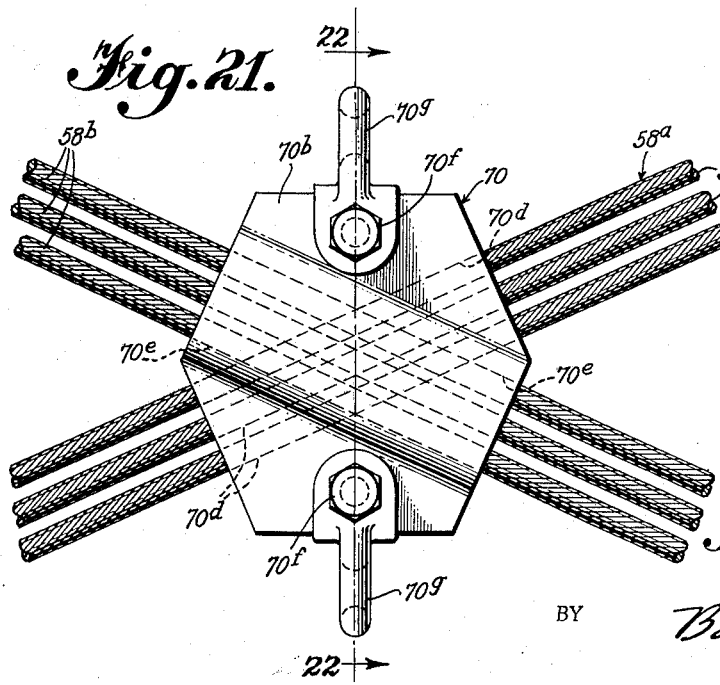

Oct. 28, 1958 J. E. LUCAS 2,858,105
CABLE TYPE GRIPPING DEVICE FOR CAISSONS
OR PILINGS AND METHOD
Filed July 19, 1954 11 Sheets-Sheet 11
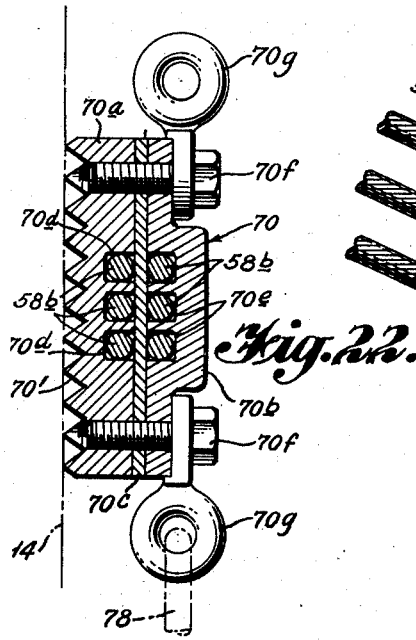
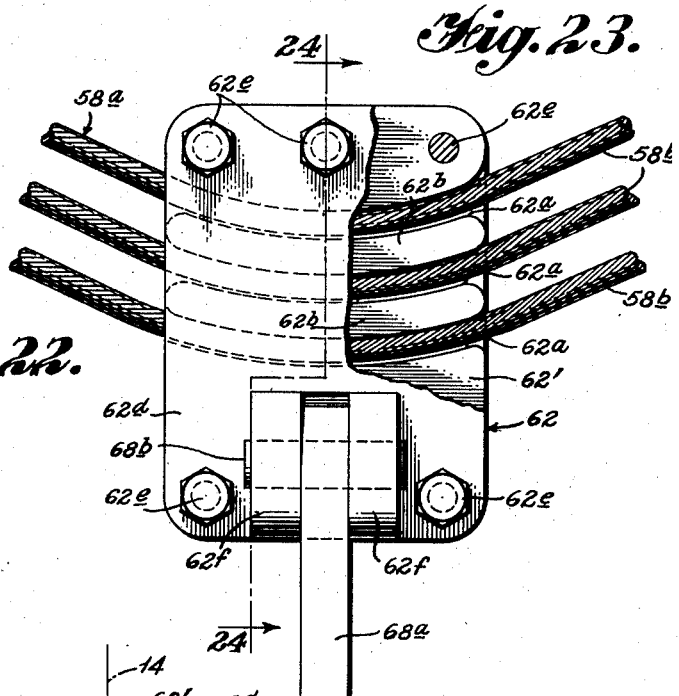
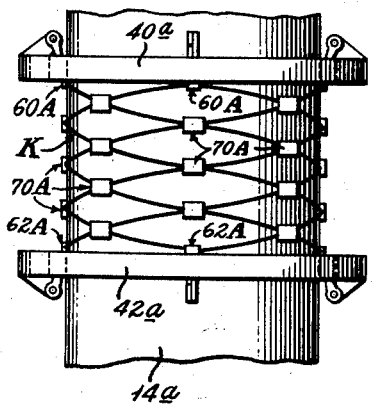
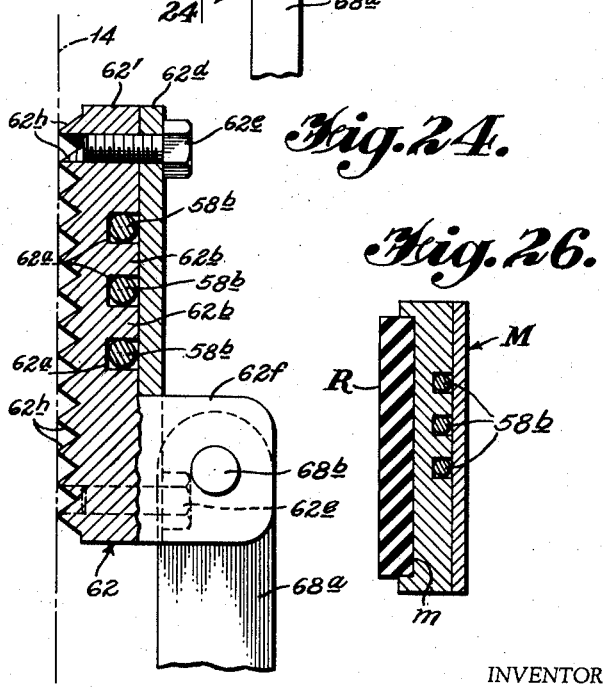
INVENTOR
Joseph E. Lucas
BY Bacon & Thomas
ATTORNEYS

2,858,105

CABLE TYPE GRIPPING DEVICE FOR CAISSONS OR PILINGS AND METHOD

Joseph E. Lucas, Caracas, Venezuela

Application July 19, 1954, Serial No. 444,287

31 Claims. (Cl. 254—107)

This invention relates to a jacking method and apparatus including a novel self-energizing cable means for tightly gripping generally smooth-walled caissons or pilings. The self-energizing action is achieved through the employment of an improved mesh arrangement of cables which, after initial engagement with the caisson or piling, is automatically self-energized or contracted into engagement with the caisson or piling by the weight load on the cables, so that the heavier the load the tighter will be the gripping action produced. The cables are so arranged in the jacking apparatus as to uniformly grip and apply controlled axial force to the caisson or piling.

The jacking apparatus includes at least two cable meshes that are interconnected and inherently operate during a jacking operation so that one cable mesh must be in full gripping engagement with the caisson before the other cable mesh can be released from the caisson.

This jacking apparatus is particularly useful for effecting axial movement of a caisson relative to a barge or any other marine structure. Any number of the devices may be used on a caisson-equipped marine structure. Such devices may be used for lowering the caissons until firm bottom is reached. The devices are then further operated to raise the marine structure to a desired height above the water. The devices are then used to hold the marine structure in its raised position while any desired operations are being performed. The devices can be used at the end of these operations to lower the marine structure back onto the water and to later raise the caissons. The devices may also be used to hold the caissons in a raised position while the marine structure is being moved from one location to another.

A common use for the invention is on barges or other marine structure equipped with well drilling and/or well servicing machinery for use in over-water oil production.

The novel gripper element of the present invention consists generally of a tubular mesh of cables, which can contract and grip an object with substantially uniform pressure throughout the full axial length of the mesh. The individual cables of the mesh are in the form of an endless loop of a generally elliptical shape. The long axis of each elliptical loop is oblique to the axis of the caisson. In other words, the loops are disposed on a low angle which may vary from about 20 to 35° to a plane perpendicular to the axis of the mesh when the mesh is in its fully contracted condition, the preferred angle being about 25°. Each elliptical loop of the mesh is attached by hangers and links at the ends of its long axis to spaced rings. The several elliptical cable loops are attached to the rings at spaced points around the rings so that the loops cross each other.

In order to effect even tension and uniform distribution of stress, the cables are separated at their points of crossing by cross-over fittings. These cross-over fittings prevent binding and/or cutting action of the cables against each other. Danger of collapsing the caisson is also avoided by the uniform distribution of the compression stresses applied by the cables. These fittings also make it possible to use smaller cables and to cross the cables at a greater angle and still obtain adequate self-energization. This will also allow greater radial movement of the cable mesh resulting in greater clearance around the caisson when the mesh is released. The rings carry inwardly extending guide brackets that center the rings about the caisson, and prevent cocking during axial movement. The centering guides also keep the cable mesh from rubbing against the caisson surface and dragging the cables out of alignment during axial movement and even, perhaps, energizing or initiating gripping action and/or bringing the movement to a stop by perhaps rolling one cable under another. Those cross-over fittings which are vertically aligned are connected to each other and with the upper ring by suspension chains. The remaining cross-over fittings are connected by suspension chains with the hanger fittings. In this way, the cross-over fittings properly position the cables for gripping engagement with the caisson surface. In this connection, the hanger fittings and the cross-over fittings have teeth that bite into the caisson surface and materially help the gripping action that has been initiated. The hangers and cross-over fittings may be surfaced with rubber, instead of teeth, for use on other than metal surfaces. They are also helpful in enabling the device to "fail safe" in the event of a power failure under load as they will help to keep the cable loops in place.

When the rings are moved apart, the cable mesh is axially lengthened and it radially contracts into gripping contact with the caisson to initiate the self-energizing action thereof. On the other hand, when the rings are moved toward each other, the cable mesh expands radially and the grip on the caisson is released. Special provision is made for releasing the cable mesh when under load, as will appear later. Both rings are engaged with shoulders on a frame work at the time when the cable mesh is released. One ring or the other is moved away from its shoulder to stretch or contract the cable mesh, depending upon the direction in which the axial force is to be applied to the caisson. After the cable mesh firmly grips the caisson, the rings and mesh are moved to effect axial movement of the caisson itself. Meanwhile, a similar mesh of cables and rings is maintained released while the caisson is being moved. At the end of the movement, the second cable mesh is actuated into gripping engagement with the caisson to hold it in the position to which it has been moved. The first cable mesh is then released and moved back along the caisson to its initial position and the cycle is repeated. The direction of the axial movement of the caisson depends upon the direction of the jacking effort and the sequence in which the two sets of cable meshes are operated. The foregoing is the basic principle of operation of this jacking device.

The principal objects of the invention are to provide:

(1) A jacking device capable of cutting through any material fouling the outer surface of a caisson or piling, such as, marine growth, grease, etc., to effect a tight grip;

(2) A jacking device including gripping elements that adapt themselves to surface irregularities;

(3) A jacking device capable of gripping a variety of surfaces, such as smooth steel, concrete, etc.;

(4) A jacking device wherein the gripping elements are self-energizing and capable of applying axial force to a caisson in either direction;

(5) A jacking device including elements which will not cock and bind and interfere with jacking operations;

(6) A self-energizing jacking device that will effect and maintain a tight grip upon a caisson even when power fails while under load;

(7) A jacking device wherein separate, but interconnected, gripping elements are operable in any desired sequence;

(8) A jacking device having a pair of gripping elements which inherently requires one gripping element to be fully actuated before the other can be released when under load, thereby preventing the barge from being accidentally dropped;

(9) A jacking device embodying a mesh of cables for gripping a caisson and which mesh occupies only a small axial space when fully extended;

(10) A jacking device embodying a mesh of cables wherein the individual cables are identical and interchangeable;

(11) A jacking device wherein broken or damaged elements can be easily removed and replaced without use of a crane or removing the jacking device from the caisson;

(12) A power operated jacking device that will "fail safe" in the event of power failure when under load;

(13) A jacking device wherein expensive machined surfaces and the maintenance of such surfaces under corrosive conditions are eliminated;

(14) A jacking device which has a much greater capacity for its weight than prior jacking devices;

(15) A jacking device in which the gripper elements used to produce jacking effort can be utilized to mechanically lock the barge to the caisson and safely hold the barge at the desired elevation indefinitely; and

(16) A jacking device that can be produced at greatly reduced costs compared with previous jacking devices used for a similar purpose.

In the drawings:

Fig. 1 is a side view of a caisson jacking apparatus embodying the present invention, with portions cut away and showing fragmentary parts of a supporting barge and a caisson;

Fig. 3 is a sectional view taken along the line 3—3 of Fig. 1;

Fig. 4 is a fragmentary view of one of the tubular mesh gripper elements shown in Fig. 1;

Fig. 5 is a sectional view, on an enlarged scale, taken along the line 5—5 of Fig. 3;

Fig. 6 is a fragmentary sectional view showing one of the lugs for connecting the cross-over fittings to an upper ring;

Fig. 7 illustrates the relative positions the parts assume at the beginning of a jacking operation;

Figs. 8, 9 and 10 illustrate the relative positions the parts assume during the lowering of the caisson and elevating the barge to a position above the water;

Fig. 11 illustrates a wedge arrangement for mechanically locking the barge in raised position;

Figs. 12, 13 and 14 illustrate the relative positions the parts assume during the lowering of the barge from its elevated position to a position where it is supported by the water;

Fig. 15 is a vertical sectional view through one of the jacking cylinders;

Figs. 16 and 17 illustrate the relative positions the parts assume during the raising of the caisson off the bottom while the barge is afloat;

Fig. 18 is an elevational view illustrating details of one of the cable hangers which secures the ends of one cable loop to the upper ring of a gripping device;

Fig. 19 is a sectional view taken on the line 19—19 of Fig. 18;

Fig. 20 is an end view of the hanger shown in Fig. 18;

Fig. 21 is an elevational view of one of the crossover fittings;

Fig. 22 is a vertical sectional view taken on the line 22—22 of Fig. 21;

Fig. 23 is an elevational view of one of the hangers which connects the middle section of one cable loop to the lower ring of a gripping device;

Fig. 24 is a vertical sectional view taken on the line 24—24 of Fig. 23;

Fig. 25 is a diagrammatic view of a cable mesh comprising helical cables; and

Fig. 26 is a sectional view showing a non-metallic, resilient facing that can be used on the hangers and crossover fittings for gripping a caisson having an easily damaged surface.

Figure 2:
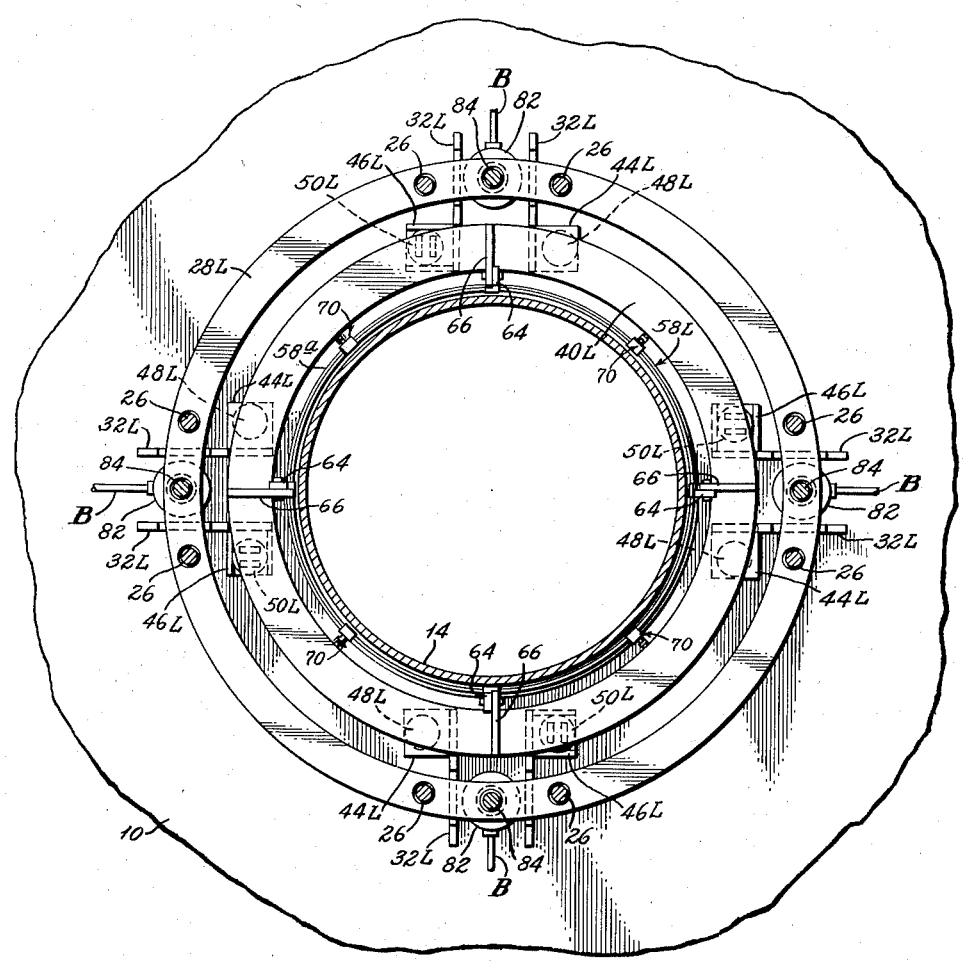
Fig. 2 is a sectional view taken along the line 2—2 of Fig. 1.

Fig. 1 illustrates a fragment of a barge having an upper deck 10. The barge has a number of caisson wells 12, only one of which is shown. A cylindrical caisson 14 is disposed for vertical movement in each well. It is to be understood that a separate jacking apparatus is associated with each caisson and that, while the description herein will refer to one jack, the same operations may be performed with all other jacks, at will.

The barge 10 is provided with a clamping device 16 for positively holding the caisson 14 in position relative to the well 12. The clamping ring 16 may be of any desired construction for gripping and holding the caisson 14.

The jacking apparatus consists generally of an upper gripping device 18 and a lower gripping device 20. These devices are interconnected and connected with the barge deck 10 by a plurality of rods 26. These rods extend through openings in the deck 10 of the barge and are threaded into nuts 24 disposed in pockets 22. The devices 18 and 20 are further interconnected by jacking cylinders 82 and their associated piston rods 84.

THE UPPER GRIPPING DEVICE 8

The upper gripping device 18 includes a frame comprising an upper ring 28U and a lower ring 30U. The rods 26 pass through the ring 30U. Nuts 26a are threaded on the upper end of the rods 26 and engage the ring 30U. The rings 28U and 30U are held apart by spacer plates 32U arranged in pairs around the frame and welded to the rings 28U and 30U. Each of the plates 32U is provided with an inward extension 34U forming upper and lower shoulders 36U and 38U. The surfaces 35U and 37U of the plates 32U are inclined between the shoulders 36U and 38U and the upper and lower ends of the plates 32U and serve as centering surfaces for the supporting rings 40U and 42U, respectively, as they engage their associated shoulders. Downwardly and upwardly inclined guides G on ring 40U aid entry of the caisson 14 into the jack assembly.

The plates 32U are provided with brackets 44U and 46U upon which are mounted ring actuating cylinders 48U and 50U. The cylinders 48U and 50U are each provided with a piston (not shown) and piston rods 52U and 54U, respectively. The piston rods 52U are connected to the ring 42U. The piston rods 54U are connected to the ring 40U. The cylinders 48U are provided at their upper ends with fluid connections 56U and at their lower ends with connections 57U. Similarly, the cylinders 50U are provided at their upper ends with fluid connections 59U and at their lower ends with connections 61U. Standard control valves (not shown) connect the cylinders 48U and 50U with pressure fluid or vent the same to atmosphere, as desired.

The upper gripping device 18 includes a generally tubular cable mesh 58U made up of a plurality of loops 58a, each consisting of 3 cable strands 58b. As shown in Figs. 4, 18 and 19, each of the strands 58b has a cable socket 58c secured to its ends. The cable loops 58a are generally elliptical in shape and extend around the caisson 14 with the long axis thereof in a plane oblique to the axis of the caisson. Each cable loop 58a lies in a different plane. The cable sockets 58c at the ends of the individual strands 58b and any given loop 58a, are connected to a hanger 60 by pins 60a, as shown in Figs. 18 and 19. The hangers 60 carry lugs 60b to which one end of a link 64 is connected by a pin 64a. The other end of the link 64 is pivotally connected by a pin 64b (Fig. 1) to a bracket 66 mounted on the ring 40U. The hangers 60 have sharp teeth 60c for cutting through any foreign matter and into the outer surface of the caisson 14.

The several strands 58b of each loop 58a, slidably extend through a hanger 62 (Figs. 1, 23 and 24). Each hanger 62 includes a body 62' having a groove 62a for each of the strands 58b, and a rib 62b which maintains the two lower strands spaced from the upper strand. The strands 58b are retained in the grooves 62b by a plate 62d fastened to the body 62' by cap screws 62e. The body 62' has a pair of lugs 62f to which one end of a link 68a is connected by a pin 68b. The other end of the link 68a is connected to a bracket 68 (Fig. 1) carried by the ring 42U. The body 62' has teeth 62h similar to the teeth 60c. The hangers 60 and 62 are aligned with the long axis of the elliptical shaped loops 58a.

The cable loops 58a cross each other at spaced points around the caisson 14 (see Figs. 1 and 4). At these points, they pass through a cross-over fitting 70, shown in detail in Figs. 21 and 22. Each cross-over fitting 70 comprises a body 70a, a cover 70b and a separator plate 70c between the body and cover. The body 70a and the cover 70b each have channels 70d and 70e, respectively, through which strands 58b of the crossed loops extend. The plate 70c prevents the strands 58b of the outer loop from binding or cutting against the strands 58b of the inner loop. The body 70a, the cover 70b and plate 70c are fastened together by cap screws 70f. A lug 70g may be mounted on the cross-over fitting 70 above and/or below the region where the cables cross. As shown in Fig. 4, only one lug 70g is attached to the cross-over fitting 70 at the mid-portion of the figure; whereas, the cross-over fittings on either side thereof each carry two lugs 70g.

The lugs 70g are connected to a chain 78 wherever the cross-over fittings 70 are in vertical alignment with each other. A lug 60' on the hangers 60 is connected by a chain 78a to a cross-over fitting 70 at those locations where the hangers 60 are above the cross-over fittings 70. Lugs 40a (Fig. 6) are welded to the ring 40U at points between the hangers 60 and are connected by a chain 78b to the fittings 70 aligned therewith. All of the cross-over fittings 70 are provided on their inner face with teeth 70' to bite into the surface of the caisson. The chains 78, 78a and 78b serve to position the cables of the tubular mesh 58a around the caisson 14 when the mesh is contracted to grip the caisson 14.

It will be noted from Fig. 1 that the brackets 66 and 68 project to a point near the caisson 14. These serve as centering guides to center the rings 40U and 42U about the caisson 14 and also position the frame of the gripping device 18 concentric with the caisson. These centering guides also position the cable mesh 58U concentric with the caisson 14 through the links 64 and 68a. Thus, the mesh 58U is held clear of the caisson when it is released.

The cylinders 48U and 50U are double acting and are independently operable to move the rings 40U and 42U into or out of engagement with corresponding shoulders 36U and 38U. The rings 40U and 42U are held in contact with the shoulders 36U and 38U when the mesh 58U is released to permit axial movement of the mesh and/or caisson 14. Either ring may be independently moved away from its shoulder toward the end of the plates 32U to initiate gripping action. In this connection, the rods 26 have ample clearance in all of the openings through which they extend to prevent interference with axial movement of the device 18. This clearance also permits swinging movement of the rods 26 in any direction to enable the gripping device 18 to align itself with the caisson 14.

THE LOWER GRIPPING DEVICE 20

The lower gripping device 20 is nearly identical with the upper gripping device 18, and the corresponding parts thereof have been given the same numbers but are distinguished by the letter "L" instead of the letter "U." One difference between the two gripping devices is that the plates 32L of the device 20 are spaced farther apart than the plates 32U of the device 18 to accommodate jacking cylinders 82 therebetween. Another difference is that the rods 26 extend through both rings 28L and 30L of the device 20.

THE JACKING CYLINDERS 82

One of the jacking cylinders 82 is shown in cross-section in Fig. 15. A head 90 is clamped to the ring 30L by studs 90a and a cross bar 90b. The lower end of the cylinder 82 is secured to the head 90 by the bolts 98. A conduit C is connected to the head 90 and communicates with a passageway 100, leading to the lower end of the cylinder 82. The upper end of the cylinder 82 is secured to a head 106 by bolts 107. The head 106 has a bore 108 of smaller diameter than the cylinder 82. An O-ring 110 is mounted in the bore 108 near its lower end. A conduit B is connected to the head 106 and communicates with the upper portion of the bore 108. Another conduit A communicates with a passageway 118 in the cylinder 82 just below the bore 108. The cavity formed by the bore 108 is converted into a trap chamber 108a when the conduit B is closed.

The conduits A, B and C are connected to a fluid system including standard control valves (not shown) where any of the conduits may be connected to pressure or vented.

A piston 112 is connected to the rod 84 and has an extension 114 of a diameter slightly less than the bore 108. A packing 116 seals the rod 84 in head 106.

The piston rods 84 of the cylinders 82 extend through the ring 28L and are connected to extensions 86 of the plates 32U of the device 18 by a pin 88.

AUXILIARY MECHANICAL SAFETY LOCKING DEVICE

An auxiliary mechanical safety locking device is provided to help hold the barge in an elevated position on the caisson, as will be described hereinafter. Such device is shown in Fig. 11 and includes pairs of wedges 162 (only one pair of which is shown) drawn together by bolts 164 and nuts 165. The lower edges of the plates 32U of the device 18 are bevelled at 158 and the upper edges of the plates 32L of the device 20 are bevelled in the opposite direction at 160.

*Method of operation*

1. JACKING DOWN CAISSONS AND RAISING BARGE

Assuming that the barge is at the desired location, the jacking apparatus is manipulated as follows to jack the caisson 14 down and/or to raise the barge.

Fig. 7 illustrates the gripping devices 18 and 20 and the ring 16 in their released position prior to a jacking operation. It will be noted that the plates 32L of the device 20 are engaged with the barge deck 10 and that the surfaces 86a of the device 18 are resting upon the top surface 86b of the ring 28L of the device 20. The caisson 14 is now either in engagement with the bottom or floating if buoyant. If the caisson 14 is buoyant, it must be jacked down into contact with firm bottom before the barge can be raised.

To start the jacking operation, conduits A and B are vented and conduits C are connected to pressure fluid to move piston 112, piston rods 84, and the frame of the device 18 upwardly until the ring 30U of the device 18 abuts the nuts 26a on rods 26. This action is shown as Step No. 1, Fig. 8.

Subsequent operations will be better understood if it is kept in mind that the device 18 remains stationary, relative to the barge, with ring 30U in contact with the nuts 26a during the entire time that the caisson 14 is being jacked down and/or the barge is raised. The piston rods 84 connected to device 18 remain stationary. The device 20 with attached cylinders 82 moves up and down relative to the piston rods 84. The caisson 14 is jacked down during the downward movement of device 20. The jacking effort, therefore, is opposed by the barge and the barge is raised through the rods 26, device 18 and piston rods 84. Cylinders 48U and 48L are now used only to hold rings 42U and 42L against shoulders 38U and 38L.

Pressure fluid is next connected to the lower ends of cylinders 50U to extend the piston rods 54U, to move the ring 40U of the device 18 upwardly to contract the cable mesh 58U to grip the caisson 14, as shown in Step No. 2, Fig. 8. The device 18 is now supported by cable mesh 58U on caisson 14.

The conduits A and B of the jacking cylinders 82 are next connected to pressure fluid and conduits C are vented to raise the device 20 to the upper limit of its travel where surfaces 86a engage surfaces 86b, as shown in Step No. 3, Fig. 9. Pressure fluid is connected to the lower end of cylinders 50L to extend piston rods 54L to raise the ring 40L to contract the cable mesh 58L to grip the caisson 14, as shown in Step No. 4, Fig. 9. Conduits A and B are then vented and conduits C are connected to pressure fluid, to move device 20 and the caisson 14 in a downward jacking motion. This motion transfers the weight of the device 18 from the cable mesh 58U to cable mesh 58L, as shown in Step. No. 5, Fig. 10. Concurrently, pressure fluid is connected to the upper end of cylinders 50U to retract the piston rods 54U, to release the mesh 58U from the caisson 14, as shown in Step No. 6, Fig. 10. The end of the stroke is reached when plates 32L contact the barge deck 10.

In Step No. 7, the cylinders 50U of device 18 are again actuated to cause the cable mesh 58U to grip and hold the caisson 14 in place, as in Step No. 2. In Step No. 8, the device 20 is again raised to get a new grip on caisson 14, as in Step No. 3. Concurrently, Step No. 9 is taken, connecting pressure fluid to the upper end and vent the lower end of cylinders 50L to release mesh 58L. These motions transfer the weight of device 18 and the barge back to mesh 58U. Steps Nos. 4, 5 and 6 are then repeated to jack the caisson 14 downwardly.

Steps Nos. 2 to 9, inclusive, are repeated until the caisson 14 reaches firm bottom. These same steps are repeated to raise the barge above the water to the desired level.

If the barge is to remain elevated for some time, it is desirable to mechanically lock the barge to the caisson 14 so that it will not settle as a result of leakage in the fluid jacking system.

2. LOCKING BARGE IN RAISED POSITION

Assuming that the barge has reached the desired level during a jacking stroke, as shown in Fig. 10, the jacking stroke is continued, to raise the barge slightly above this level and is then stopped and held by closing conduits C of cylinders 82. Mesh 58U is then actuated as shown in Step No. 10, Fig. 11, to grip the caisson 14. Pressure is then vented from conduits C and applied to conduits A and B to raise device 20 to bring surfaces 86a and 86b into abutment. Concurrently with this step, the mesh 58L is released. The entire weight of the barge is now supported by mesh 58U of device 18, through rods 26. When surfaces 86a and 86b are in abutment, mesh 58L is actuated to also grip the caisson, as in Step No. 11, Fig. 11. Due to the gripping action of mesh 58U being self-energizing, all fluid pressure in the entire system may now be released and the caisson 14 is mechanically locked to the barge through the mesh 58U. Mesh 58L is gripping caisson 14 but does not now support any of the barge weight as no downward movement relative to the caisson has taken place transferring any weight to mesh 58L to energize it.

3. APPLYING AUXILIARY MECHANICAL LOCKING DEVICE

To make the locking doubly secure, the barge load may be divided between meshes 58U and 58L by inserting the safety wedges 162, between the surfaces 158 and 160 and the unts 165 are tightened to draw the wedges together. This forces device 20 downwardly, thereby transferring a part of the barge weight from mesh 58U to mesh 58L, as shown in Step No. 12, Fig. 11. This energizes mesh 58L providing an auxiliary mechanical caisson-to-barge lock, and lowers the working stresses on the entire jacking apparatus.

4. LOWERING BARGE ONTO THE WATER

The barge is maintained in its elevated position as long as required. When it is desired to move the barge the wedges 162 (Fig. 11) are removed and it is lowered onto the water.

It will be easier to understand this operation if it is kept in mind that device 20 now, instead of being moved to the upper end of its stroke to take a new grip on the caisson 14 to raise the barge, is moved down to the lower end of its stroke to take a new grip on the caisson. This is the reverse of the jacking action and allows the barge to descend by gravity through controlling the rate at which fluid is vented through conduits C.

During the barge lowering operation a problem arises which was not present in the operations previously described. As previously mentioned, the weight of the barge produces a self-energizing action in the mesh 58U, making it difficult to release the mesh. In general, this self-energizing force is overcome by making a short jacking stroke to transfer the barge weight from mesh 58U to mesh 58L before each lowering stroke, while pressure fluid is acting in cylinders 50U to release the mesh 58U.

More specifically, the upper end of cylinders 50L are connected to pressure fluid to bring ring 40L into abutment with shoulders 36L. Concurrently, conduits A and B are connected to pressure fluid and conduits C are vented to raise device 20 until surfaces 86a engage surfaces 86b. This transfers the barge weight on mesh 58L back to mesh 58U, so mesh 58L can be released.

Conduits A are vented and conduits B are closed to make trap chambers 108a effective. Conduits C are next connected to pressure fluid to move device 20 downwardly until the piston extensions 114 enter the trap chamber 108a. This stops the downward movement with plates 32L spaced a short distance from deck 10, as shown in Step No. 13, Fig. 12, thus providing working space for the short jacking stroke needed to transfer the weight from 58U so that it may be released.

The lower end of cylinders 50L are then connected to pressure fluid to raise ring 40L to actuate mesh 58L to grip caisson 14. Conduits B are then vented allowing the downward movement of device 20 to raise the barge relative to caisson 14 in a short jacking stroke. During this short stroke, pressure fluid is connected to the upper end of cylinders 50U to move ring 40U toward shoulders 36U to release mesh 58U from caisson 14 as the barge weight is transferred from mesh 58U to mesh 58L, shown in Step No. 14, Fig. 13. The stroke ends when plates 32L abut deck 10, as shown in Step No. 15, Fig. 13. The downward movement of the barge is now opposed by the pressure fluid in the lower end of cylinders 82. Conduits C are now vented to lower the barge until surfaces 86a and 86 abut, as shown in Fig. 14, Step 16. The barge lowering rate is controlled by the fluid venting rate through conduit C.

Pressure fluid is next connected to the lower end of cylinders 50U to raise ring 40U to contract mesh 58U to grip caisson 14, as in Step No. 13, Fig. 12. The device 20 is then lowered and mesh 58L is again actuated, as in Step No. 11, Fig. 11. Steps 10 to 16, inclusive, are repeated until the barge rests on the water. At this point, both meshes 58U and 58L may be released to assume the position shown in Fig. 7.

5. RAISING THE CAISSON

The caisson raising operation will be better understood if the following factors are kept in mind. The device 20 remains in contact with and is supported by the deck 10 during this operation. The jacking cylinders 82 remain stationary and the pistons 112 and rods 84 move up and down. The cylinders 48U and 48L heretofore utilized only to hold rings 42U and 42L against shoulders 38U and 38L are now used to actuate the meshes 58U and 58L. The cylinders 50U and 50L, on the other hand, are used to maintain the rings 40U and 40L against shoulders 36U and 36L. The rods 26 and nuts 26a now function as guide rods and to define the limit of the upward movement of device 18.

To raise the caisson 14, the mesh 58U is contracted to grip the caisson 14 while in the position shown in Fig. 7, by connecting pressure fluid to the upper ends of cylinders 48U, shown in Figs. 1 and 16. Conduits C are next connected to pressure fluid to move device 18 and the caisson 14 upwardly until ring 30U abuts nuts 26a, as shown in Step No. 17, Fig. 16. Mesh 58L is now contracted to grip and hold caisson 14, by connecting fluid pressure to the upper end of cylinders 48L, as shown in Step No. 18, Fig. 17. Mesh 58U is now released by venting the upper end of cylinders 48U and connecting fluid pressure to their lower end. Concurrently, pressure fluid is vented from conduits C and connected to conduits A and B to move device 18 downwardly until surfaces 86a and 86b abut, as shown in Step No. 18, Fig. 17. Mesh 58U is now contracted to grip caisson 14. Conduits A and B are now vented and pressure fluid is connected to conduit C to raise device 18 and the caisson 14. Concurrently, mesh 58L is released, as shown in Fig. 16. The operations described in the foregoing are repeated until the caisson 14 is raised to the desired height.

Fig. 25 diagrammatically illustrates a modified form of gripping device in which the cables of the mesh are arranged helically instead of in the form of oblique loops. Thus a plurality of interlaced cables K extend helically from rings 40a and 42a, similar to the rings 40U and 42U. These cables are connected to the rings 40a and 42a by hangers 60A and 62A. The cables K pass through fittings 70A, similar to the fittings 70, at their points of crossing.

It will be apparent that the cables K can be contracted into engagement with the cassion 14A upon actuation of the rings 40a and 42a in the same manner as the rings 40U and 42U. It will also be understood that two or more sets of the meshed cables K may be employed in a single jack, in the same manner as the meshed groups of cables 58U and 58L.

Fig. 26 illustrates a modified construction wherein the member M may correspond to either of the hangers 60 or 62 or the cross-over fittings 70. As shown, the member M has a recess m in which a resilient pad of rubber R, or other material is permanently mounted. The pad is intended for use in particular with caissons having an easily damaged surface.

While the jacking apparatus has been disclosed herein in connection with a caisson of circular cross-section, it will be understood that the same principles of operation can be applied in designing a cable type jack to handle structures of other cross-sectional shapes, such as, square, hexagonal, etc.

It is to be understood that the invention is not limited to the specific embodiment described hereinbefore, which is merely illustrative, but is to be limited only by the scope of the appended claims.

I claim:

1. A gripping device, comprising: a tubular contractible mesh of cables including individual cables crossing each other at a small angle to a plane perpendicular to the axis of said mesh; and power operated means connected with said cables for contracting the mesh into engagement with an object and for releasing the mesh from said object.

2. A gripping device, comprising: a tubular contractible assembly of cables; means for contracting the cable assembly into engagement with an object and for releasing the cable assembly from said object; and means for holding the cable assembly out of contact with said object when said cable assembly is in released condition.

3. A gripping device, comprising: a tubular contractible mesh of cables, each of said cables being in the form of an elliptical loop with the loops circumferentially spaced from each other and extending in a direction oblique to the axis of said mesh; and actuating means for applying axial force to said loops including selectively operatable elements connected to said loops at either end of their long axis.

4. A gripping device, comprising: a tubular contractible cable mesh; a ring connected to each end of said mesh; means for supporting said rings and mesh in surrounding relation to an object to be gripped; and means for maintaining said supporting means in substantially concentric relation with said object.

5. A gripping device, comprising: a pair of self-energizing contractible cable assemblies for gripping and applying axial force to a caisson or the like; power operated means for independently contracting said cable assemblies into gripping engagement with said caisson; and means for converting said cable assemblies into holding elements to lock said elements to said caisson independently of said power operated means, whereby said caisson and said elements can be indefinitely locked together without applying power to said power operated means.

6. A gripping device for gripping a generally cylindrical object, comprising: a generally tubular mesh of cables adapted to surround said object, the cables of said mesh being in the form of elliptical loops extending in a direction oblique to the axis of the mesh; a ring at each end of said mesh and generally concentric thereto; means connecting said rings with the cables of said mesh at the ends of the long axis of the loops and actuating means interconnecting said rings for selectively moving said rings toward or away from each other to correspondingly radially expand or contract said mesh.

7. A gripping device as defined in claim 6, wherein the means at the long axis of the loops connecting the cable loops with the respective rings includes a hanger and a link.

8. A cable gripping device as defined in claim 7, in which each of the rings is provided with brackets extending inwardly therefrom for centralizing the rings relative to said object, and wherein the brackets are each connected with a link.

9. A gripping device as defined in claim 8, in which each cable loop extends slidably through the hanger connecting it with one of said rings.

10. A gripping device as defined in claim 8, in which the cable loops have ends terminating in sockets and the sockets are connected to the hangers attached to one of the rings.

11. A gripping device as defined in claim 6, wherein a plurality of the cables cross each other, and cross-over fittings are provided at their points of crossing and slidably receive the cables therein, said cross-over fittings including means separating the cables at the points of crossing.

12. A gripping device as defined in claim 11, wherein each cross-over fitting is provided with means for increasing the friction between the fittings and the surface of the object to be gripped.

13. A gripping device as defined in claim 11, wherein certain of the cross-over fittings are vertically aligned and wherein flexible means interconnect the cross-over fittings with each other.

14. A gripping device as defined in claim 11, in which flexible means connects the cross-over fittings with one of said rings.

15. A gripping device for gripping a generally cylindrical object, comprising: a generally tubular mesh of cables adapted to surround said object, the cables of said mesh being in the form of elliptical loops extending in a direction oblique to the axis of the mesh; a ring at each end of said mesh and generally concentric thereto; means connecting said rings with the cables of said mesh at the ends of the long axis of the loops; an annular frame supporting said rings for relative axial movement toward and away from each other; and actuating means mounted upon said frame interconnecting said rings and being operable for selectively moving said rings toward or away from each other to correspondingly radially expand or contract said mesh.

16. A gripping device as defined in claim 15 in which the annular frame includes means for centering said rings relative to said frame.

17. A gripping device as defined in claim 15, wherein the annular frame includes shoulders adapted to be engaged by said rings to limit movement thereof relative to said frame.

18. A gripping device for gripping a generally cylindrical object, comprising: a tubular contractible mesh of cables adapted to surround said cylindrical object, the cables of said mesh extending in directions oblique to the axis of said mesh; a ring at each end of said mesh generally concentric therewith; means connecting said rings with the cables of said mesh at circumferentially spaced points; an annular frame surrounding said rings and mesh; shoulders on said frame extending between said rings to limit axial movement of said rings relative to said frame in one direction; and double acting cylinders arranged on said frame to independently move either ring away from its corresponding shoulder or to hold the same thereagainst, whereby said tubular mesh may be radially expanded or contracted by holding either end thereof fixed relative to said frame and moving the other end axially.

19. Jacking apparatus for producing and controlling relative movement between a support and a generally cylindrical object in the direction of the axis of said object, comprising: a pair of axially aligned annular frames adapted to surround said object; a tubular contractible mesh of cables disposed inwardly of each frame; means for selectively securing either end of each of said meshes in fixed relation to its corresponding frame; means for selectively moving the other end of each of said meshes away from its fixed end to radially contact the selected mesh against said object; guide means mounting said frames on said support for independent movement parallel to said object; abutments carried by said support limiting the movement of said frames relative to said support; and double-acting power operated means for selectively moving said frames toward or away from each other.

20. Jacking apparatus as defined in claim 19, in which the mesh includes individual helically arranged cables.

21. Jacking apparatus as defined in claim 19, in which the mesh includes individual elliptical cable loops.

22. Jacking apparatus as defined in claim 19, wherein the guide means comprises a plurality of parallel rods swingably secured to said support and extending therefrom generally parallel to the axis of said cylindrical object, said rods extending loosely through portions of each of said frames, and said abutments being defined by portions of said support adjacent said rods and by transverse shoulder means on said rods adjacent the upper ends thereof.

23. A jacking apparatus as defined in claim 19, wherein the frames have confronting inclined surfaces; wedges positioned between said inclined surfaces and means for moving the wedges to force the frames apart independently of the double-acting power operated means.

24. Jacking apparatus as defined in claim 19, wherein the double-acting power operated means comprises a cylinder fixed to one of said frames; a piston in said cylinder connected to the other of said frames; means for selectively admitting pressure fluid to said cylinder on either side of said piston; and means for trapping pressure fluid in one end of said cylinders to limit movement of the piston toward said one end.

25. Jacking apparatus for producing and controlling relative movement between a support and a generally cylindrical object associated therewith, comprising: a pair of annular gripping devices disposed one above the other and surrounding said object, each of said devices including a gripping element for gripping said object; means for selectively energizing said elements to grip said object; means mounting said gripping devices on said support for independent movement generally parallel to said object; abutments limiting the movement of the upper of said gripping device in a direction away from said support; the lower gripping device being disposed between said upper gripping device and said support and having a power cylinder mounted thereon generally parallel to said axis, the end portion of said cylinder nearest said upper gripping device being of reduced inside diameter and defining a trap chamber, said cylinder having a working chamber adjoining said trap chamber; a piston moveable in said cylinder and connected to said upper gripping device, said piston having a portion of reduced diameter corresponding to the diameter of said trap chamber; at least three fluid conduits communicating with said cylinder, one conduit at the end of the working chamber remote from said upper gripping device, a second conduit adjacent the juncture of said working chamber and trap chamber, and a third conduit at the end of said trap chamber nearest said upper gripping device, whereby pressure fluid may be admitted to said cylinder through said one conduit and said second and third conduits may be selectively closed or vented to effect either a full or partial stroke of said piston.

26. Jacking apparatus, as defined in claim 25, wherein the parts are so dimensioned and arranged that, with the upper gripping device in engagement with its abutment, the said partial stroke of said piston positions said lower gripping device close to but spaced from said support and a full stroke of said piston engages said lower gripping device with said support.

27. In a method of moving an elongated object axially relative to a support, the steps comprising: gripping and supporting said object by stationary self-energizing gripping means that is contracted about said object upon engagement therewith by the weight load of the said object; gripping said object about its circumference at a point spaced axially from said gripping means and applying axial force to said object at said point in a direction opposing said load to relieve said gripping means of said load; and then releasing said gripping means from said object while maintaining the grip on said object at said point.

28. In a caisson jack, a gripping device adapted to surround and grip a caisson, comprising: a frame; an annular, contractible assembly of cables and caisson-gripping elements mounted in said frame, said caisson-gripping elements being connected with said cables and being movable by said cables, upon contraction of said cables, into gripping engagement with a caisson; means for contracting said cables to engage said caisson-gripping elements with a caisson; and means for retracting said cables and caisson-gripping elements from said caisson.

29. In a caisson jack, a pair of gripping devices disposed one above the other and adapted to surround and grip a caisson, each of said gripping devices comprising a frame, an annular contractible assembly of cables mounted in said frame, said cables being contractible into gripping engagement with said caisson, and means for so contracting said cables; vertical tie rods interconnecting said gripping devices and providing for relative axial movement thereof, the upper end of said tie rods being connected with the upper gripping device and the lower end of said tie rods being adapted to be connected in use with a structure associated with said caisson; and jacking means interconnecting said gripping devices operable to positively move said gripping devices toward and away from each other.

30. A caisson jack as defined in claim 29, in which the jacking means and the means for contracting the cables, respectively, comprise double-acting hydraulically-operated cylinder and piston assemblies.

31. Jacking apparatus for producing and controlling relative axial movement between a support and a generally elongated object, comprising: two axially aligned, self-energizing gripping devices mounted on said support for gripping said object; means for applying a jacking force to move said devices axially in either direction relative to each other; and means, operable independently of said means for applying said jacking force, for actuating said gripping devices to grip said object simultaneously or independently of each other, and to actuate one of said gripping devices to engage said object so that the load applied thereto automatically maintains said one gripping device energized, said means for actuating said gripping devices being incapable of releasing said one gripping device when thus energized but being further operable to actuate the other gripping device to engage said object, and to release said one gripping device from said object only after the aforesaid energizing load thereon has been relieved by operation of said jacking means to move said other gripping device axially sufficiently to transfer the load from said one gripping device to said other gripping device.

References Cited in the file of this patent

UNITED STATES PATENTS

| | | |
|---|---|---|
| 1,824,768 | Braselmann | Sept. 29, 1931 |
| 2,268,598 | Kellems | Jan. 6, 1942 |
| 2,673,064 | Patterson et al. | Mar. 23, 1954 |
| 2,673,065 | Patterson | Mar. 23, 1954 |